Seiuemon Inaba
and
Akira Fujii
INVENTORS

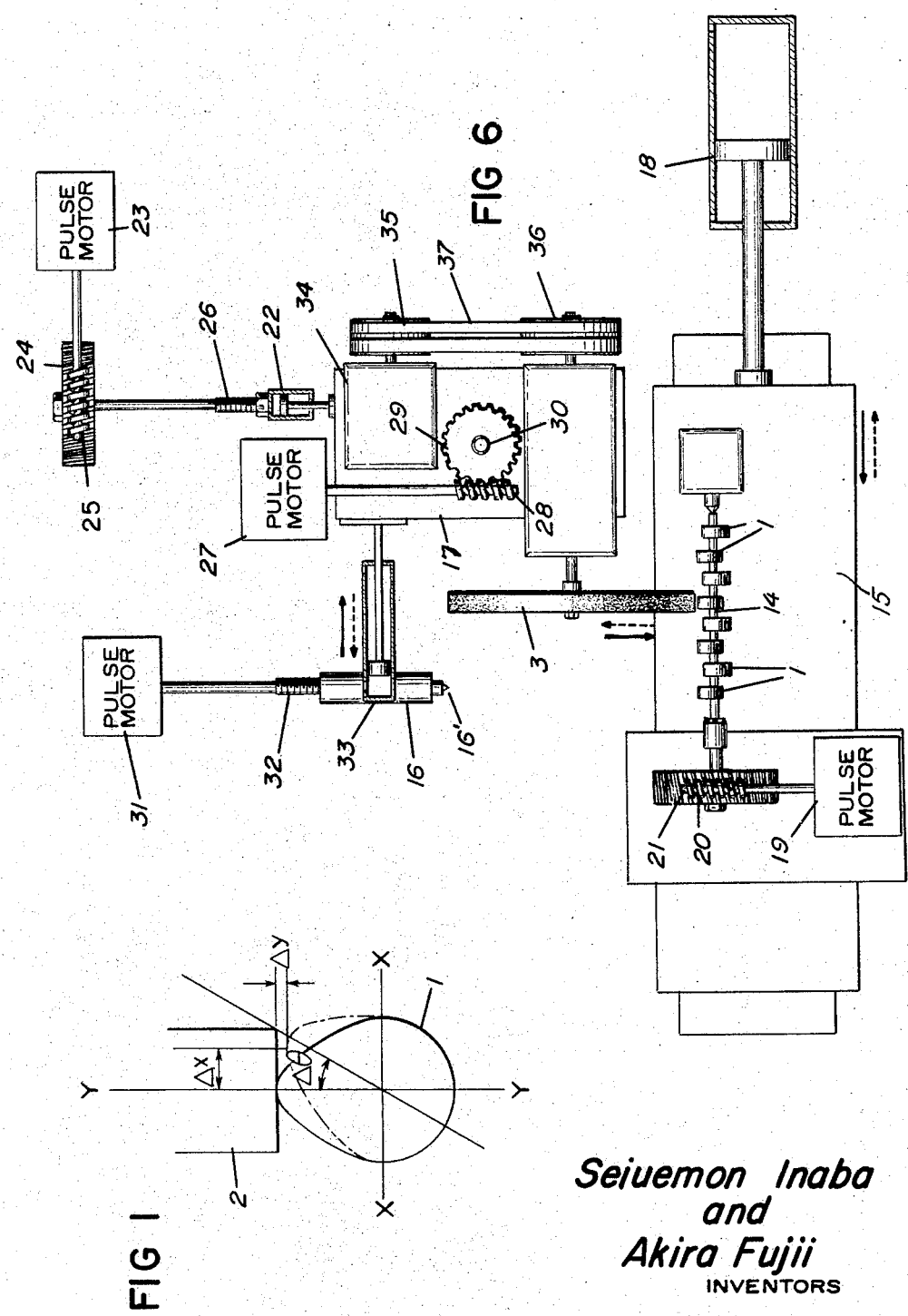

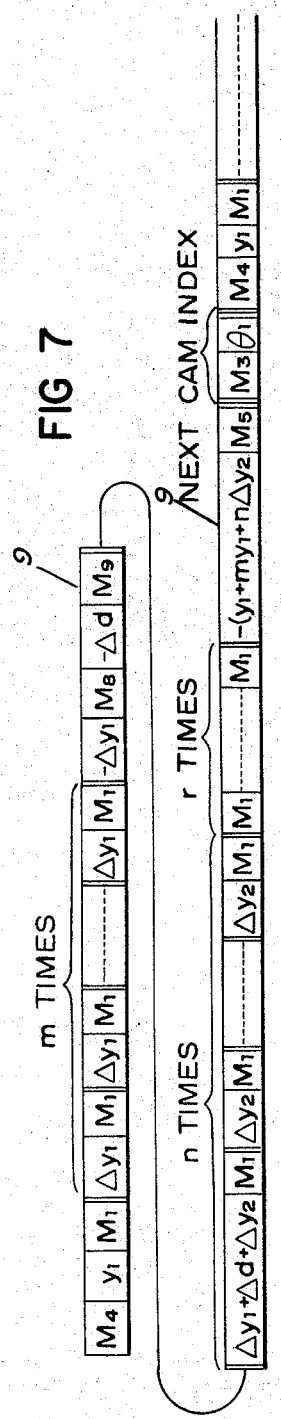

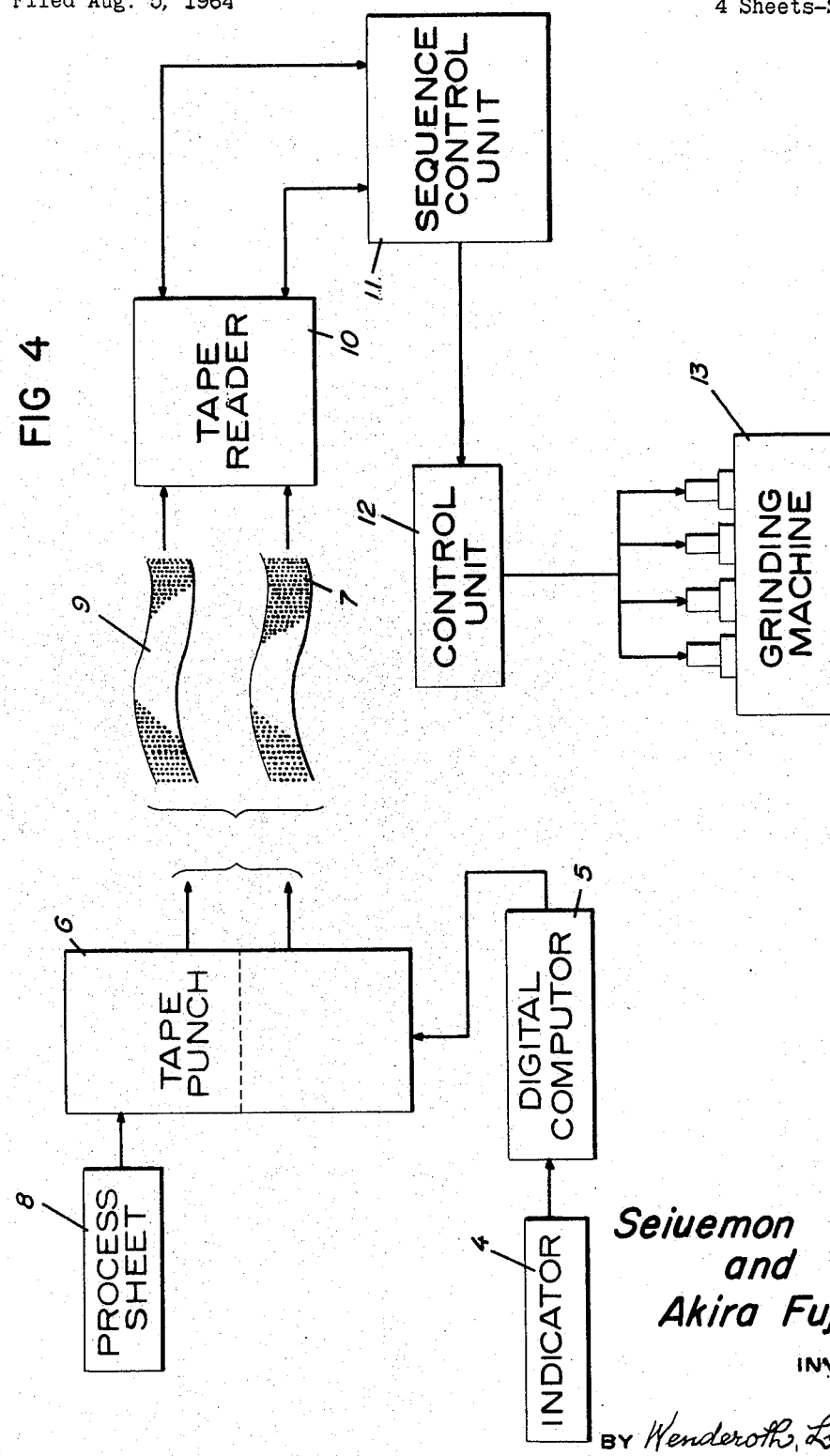

United States Patent Office 3,344,559
Patented Oct. 3, 1967

3,344,559
CAM GRINDING MACHINE BY MEANS OF
NUMERICAL CONTROL
Seiuemon Inaba, Kawasaki-shi, and Akira Fujii, Fuchu-machi, Aki-gun, Japan, assignors to Toyo Kogyo Company Limited, Aki-gun, Hiroshima-ken, Japan, a Japanese company
Filed Aug. 5, 1964, Ser. No. 387,718
Claims priority, application Japan, Aug. 9, 1963,
38/42,333
8 Claims. (Cl. 51—105)

This invention relates to a grinding machine for grinding rotating type cams by means of numerical control.

An object of the invention is to provide a grinding machine for rotating type cams wherein the rotation of the cam is controlled by a profile tape which will eliminate discrepancies caused by wear in succeeding cams.

A further object of the invention is to provide a control by a sequence tape for controlling the dressing means for a grinding wheel, means for moving said grinding wheel and cam, and indexing feeding and revolution means for said cam.

With the above and other objects in view, one preferred modification of the invention is shown in the drawings in which:

FIGURES 1, 2 and 3 are diagrammatic views illustrating the fundamental features upon which the present invention is based.

FIGURE 4 is a diagrammatical view illustrating an overall system for carrying out the invention.

FIGURE 6 is a diagrammatic plan view of an example of a grinding machine for carrying out the invention.

FIGURE 7 illustrates a profile tape for controlling the operation of the machine, and FIGURE 8 illustrates a sequence tape also for controlling the operation of the machine.

Figure 5:
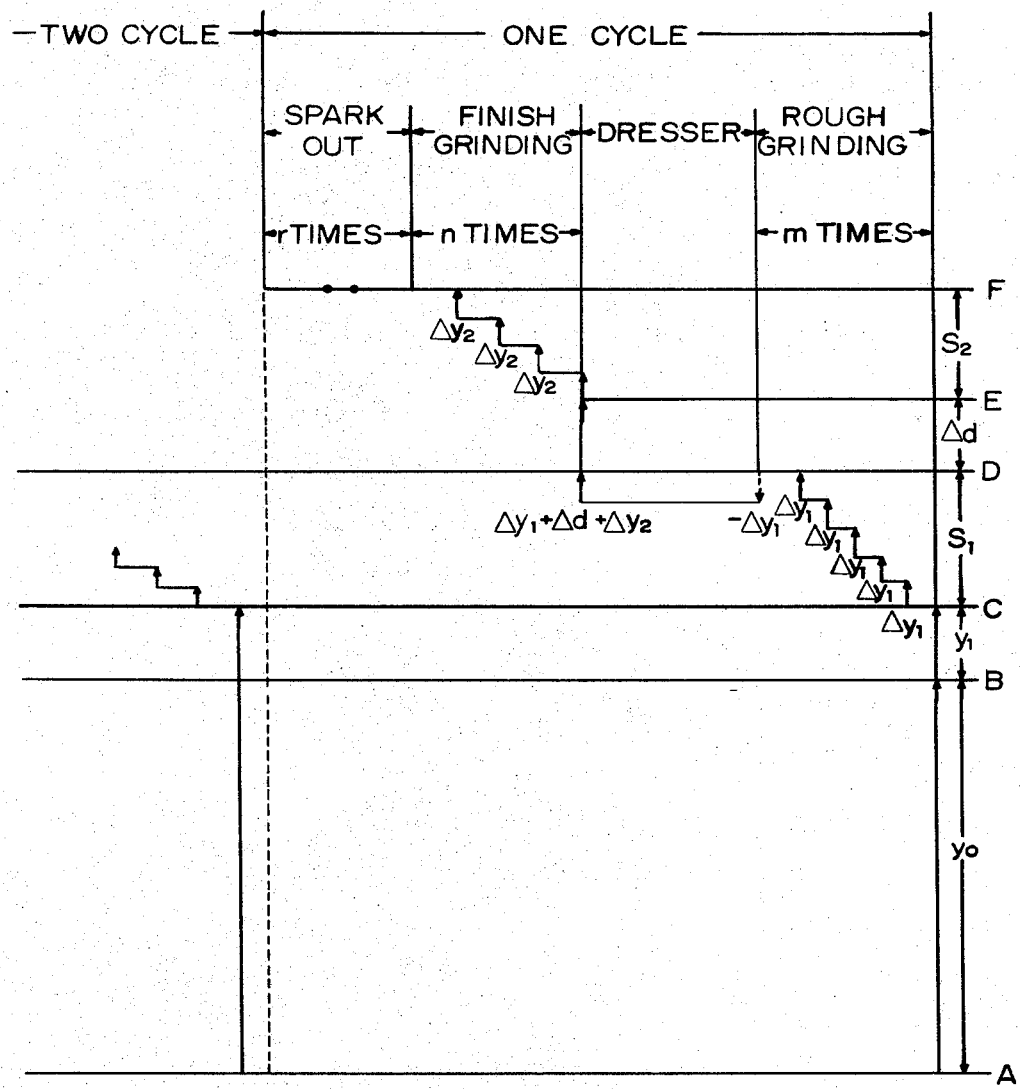
FIGURE 5 is a chart showing the grinding cycle.

The invention relates to a grinding machine which grinds, by means of numerical control, such rotating type cams as a camshaft for the intake and exhaust valves of internal combustion engines. In the past, such rotating type cams have been generally ground by profile modeling using a master cam, but manufacturing of the "model cam or master cam" for this profile modeling has required much labor and time, and especially, a decrease of the radius of the grinding wheel caused by its wear while in grinding operation has appeared as an error of the form of the rotating type cam produced therefrom, thus rendering it difficult to make a cam with high accuracy and involving poor economy owing to the necessity for frequent replacement with a new grinding wheel.

This invention provides a grinding machine for rotating type cams which operates by means of numerical control, which is designed so as to completely exclude such conventional defects and efficiently grind a large number of rotating type cams with the same accuracy, thus greatly contributing towards the improvement of the performance of the internal combustion engine and other parts where such rotating type cams are employed.

An explanation of one example of this invention is given in connection with a grinding machine for a camshaft of an internal combustion engine as follows. It is well known that the movement of the point of contact between the cam of a camshaft and the valve lifter in the internal combustion engine can be expressed as an increment, as shown in FIG. 1, according to the rotation of the cam. In accordance with the rotating angle increment $\Delta\theta$ of the cam 1, the lift $\Delta Y$ of the valve lifter 2 and the offset $\Delta X$ at the point of contact are based on the form of the cam.

In order to grind, by means of a high-speed revolving grinding wheel 3, a cam which is able to obtain the aforementioned lift $\Delta Y$ of the valve lifter, it is required as shown in FIG. 2 to move the axial center of the grinding wheel 3 an increment in the directions of the Y—Y line and X—X line according to the rotating angle increment $\Delta\theta$ of the cam in the same manner as the aforementioned lift $\Delta Y$ and offset $\Delta X$, while rotating the cam 1 at the fixed speed. In such case, when a large number of cams are consecutively ground by the grinding wheel 3, the circumferential face of the grinding wheel 3 is worn and deformed, making its outer diameter inaccurate. Therefore, in order to correct for this deformation of the circumferential face of the grinding wheel and maintain the correct point of contact between the grinding wheel and the cam, that is, the correct grinding position, the circumferential face of the grinding wheel is dressed by the wheel truing unit to the extent of the required amount of dress, $\Delta d$, and compensation of this dress is made by bringing the circumferential face of the grinding wheel, which has been made smaller in size owing to the dressing and has parted from the cam, closer to the cam in the direction of the Y—Y line to the extent of the amount of dress.

As mentioned above, when grinding the rotating type cam by the grinding wheel, the required form of cam is obtained while moving the grinding wheel by increments $\Delta Y$ and $\Delta X$, in the directions of the Y—Y line and X—X line according to the rotating angle increment $\Delta\theta$ of the cam, and compensation of the amount of dress is made when the grinding wheel is dressed. In addition, the stock removal at the time of grinding the cam by the grinding wheel and the in feed per one time when grinding upon dividing this amount into several feeds come into question. This stock removal is usually about 1–0.7 mm. which is divided into the rough stock removals $S_1$ of about 0.97–0.67 mm. and the finish stock removal $S_2$ of about 0.03 mm. The rough stock removal $S_1$ is divided into several in feeds, 0.02–0.01 mm. at a time, and the finish stock removal $S_2$ is also about 0.005–0.002 mm. at a time. Furthermore, such problems as the spark out after the finish grinding mentioned above and the quick traverse speed before the rough grinding are involved in grinding such cams, but these points will be discussed later when explaining one example of this invention. The following is an explanation of FIGS. 4 to 7 as to the structure of the grinding machine for grinding a camshaft of an internal combustion engine, which performs such grinding as mentioned above.

In the figures, 4 is a co-ordinate value indicating in relation to the cam profile designed as required, the increment lift $\Delta Y$ of the grinding wheel in the direction of the Y—Y line for the rotating angle increment $\Delta\theta$ of the cam. The increment (offset) $\Delta X$ in the direction of the X—X line is sought by the digital computer 5 based on the co-ordinate values 4 of $\Delta\theta$ and $\Delta Y$, and then, a process sheet indicating the grinding conditions of the cam form, which indicates the increments, $\Delta\theta$, $\Delta Y$ and $\Delta X$ in figures, is prepared. This process sheet prepared by the digital computer 5 is processed by a tape puncher 6 to prepare the profile tape 7 for numerical control, which is punched with the instructions necessary to form the rotating type cam of the required contour. 8 is the process sheet for the sequence, which is placed on the tape puncher 6 to prepare the sequence tape 9 for numerical control. The sequence tape 9 based on the sheet 8 is punched with the instructions other than those of the profile tape 7 (e.g., feed, dress, spark out, etc.). These instructions differ according to the size, material and other conditions of the rotating type cam, and appropriate instructions to take into account such conditions are prepared and given as the occasion demands. 10 is the tape reader which reads the co-ordinate values of the profile tape 7 and the sequence tape 9, and the co-ordinate values read by the tape reader 10 are fed to the sequence control unit 11. The prescribed instructions based on the co-ordinate values mentioned above are fed by the sequence control unit 11 to the three dimensional numerical control unit 12 which is designed so as to properly operate the camshaft grinding machine 13, and to grind the rotating type cam of the camshaft fitted on this grinding machine 13.

The sequence control unit 11 is, while feeding the aforementioned instructions to the three dimensional numerical control unit 12, designed to enable the profile tape 7 and the sequence tape 9 to be alternately read by the tape reader 10 through the instructions fed by the profile tape 7 or the sequence tape 9 to the sequence control unit 11.

The aforementioned camshaft grinding machine 13 consists, as shown in FIG. 6, for example, of the work table 15 which is provided with the camshaft 14, etc., and the wheel head slide 17 which is provided with the grinding wheel 3 and the wheel truing unit 16. Of these, the work table 15 is constructed, upon moving forward or backward for the fixed distance in the direction of the arrow according to the action of the hydraulic cylinder 18 for index feed, so as to transport each cam 1 of the camshaft 14 to the front of the grinding wheel 3, and this cam 1 is subject to index revolution owing to the worm wheel 21 which is revolved by the worm 20 of the elcetrohydraulic pulse motor 19 for rotation of the cam provided for on the table 15, and the motor carries out at the required speed the revolution through the increment $\Delta\theta$, one of the increments, $\Delta\theta$, $\Delta Y$ and $\Delta X$, which are necessary to form the required contour of the cam 1.

Also, the wheel head slide 17 is designed so as to move forward or backward at the required quick feed speed through the hydraulic cylinder 22 for quick feed in the direction of the arrow and to transfer the grinding wheel 3 from the appropriate starting line which is far from the cam 1 to the quick traverse speed transfer position which is near the front of the cam 1.

As to further movement from this quick traverse speed transfer position, forward or backward movement is conducted at the required speed by means of the other electrohydraulic pulse motor 23 for vertical feed. The pulse motor 23 is designed so that by moving the wheel head slide 17 in the direction of the arrow upon revolving the feed screw 26 together with the worm wheel 25 by means of the worm 24, the slide 17 will be moved forward or backward from the quick traverse speed transfer position to the rough grinding start position of the cam 1, and subsequently, will be given the required stock removal movement relative the cam, and appropriately moved forward or backward through the increment $\Delta Y$, one of the increments $\Delta\theta$, $\Delta Y$ and $\Delta X$, which are necessary to form the required contour of the cam.

Also, the wheel head slide 17 is fed in the direction perpendicular to the direction of feeding through the rotation of the worm wheel 29 together with the screw 30 by the rotation of the worm 28 of the electrohydraulic pulse motor 27 for movement through the increment $\Delta X$, one of the increments $\Delta\theta$, $\Delta Y$ and $\Delta X$, which are necessary to form the required contour of the cam.

The wheel truing unit 16 installed on the wheel head slide 17 is designed, by means of the electrohydraulic pulse motor 31 which revolves the screw 32, to approach the grinding wheel 3, and the hydraulic cylinder 33 operates so that the wheel truing unit 16 reciprocally moves in the direction of the arrow, thus enabling the diamond 16' on the top end to dress the outer circumference of the grinding wheel 3 by the fixed stock removal $\Delta d$.

The grinding wheel 3 is given a high speed revolution by means of the motor 34 for revolution of the grinding wheel through the pulleys 35 and 36, and the belt 37. Such working parts of the grinding machine 13 are all operated by the tape reader 10, the sequence control unit 11 and the three dimensional numerical control unit 12 which operate in accordance with the instructions from the profile tape 7 and the sequence tape 9.

When a large number of cams for a camshaft of an internal combustion engine is ground one by one by the grinding machine 13 designed as mentioned above, the profile tape 7 and the sequence tape 9 which provide instructions necessary to carry out the grinding cycle shown, for example, in FIG. 5 are necessary.

The marks on the sequence tape 9 shown in FIG. 7 are as follows. "$M_4$" is to provide instructions so that the hydraulic cylinder 22 for quick traverse of the wheel head slide 17 can operate and transport the grinding wheel 3 together with the wheel head slide 17 from the starting line A to the quick traverse speed transfer position B. "$Y_1$" is to provide instructions to the electrohydraulic pulse motor 23 so that the grinding wheel 3 can be transported from the quick traverse speed transfer position B to the position of wheel prior to rough grinding C at the required feeding speed. "$M_1$" is to provide instructions so that reading of the sequence tape 9 is stopped and the reacting of "$P(\Delta\theta, \Delta Y, \Delta X)$" of the profile tape 7 is commenced at the position of wheel prior to rough grinding C.

This "$P(\Delta\theta, \Delta Y, \Delta X)$" of the profile tape 7 provides instructions so that while the crankshaft of the work table 15 is rotated at the required speed by means of the electrohydraulic pulse motor 19, the grinding wheel 3 is moved forward or backward in the direction of the arrow by means of the electrohydraulic motors 27 and 23 of the wheel head slide 17, and the required contour of the cam 1 which is to be ground can be produced by the grinding wheel 3.

"$M_0$" is to provide instructions so that when the required contour of the cam receiving no feed is described once at the position of wheel prior to rough grinding C by "$P(\Delta\theta, \Delta Y, \Delta X)$," the reading of the profile tape 7 is stopped and the reading of the initial "$\Delta Y_1$" of the sequence tape 9 is commenced. Also, this "$\Delta Y_1$" provides the electrohydraulic pulse motor 23 with instructions so that the grinding wheel 3 which has been quickly traversed to the position of wheel prior to rough grinding C can be fed towards the cam 1 to the extent of the required rough stock removal $\Delta Y_1$. "$M_1$" indicated next to "$\Delta Y_1$" provides instructions similar to those of the aforementioned "$M_1$," to the camshaft 14 and the grinding wheel 3 so that the required contour of the cam 1 can be formed by "$P(\Delta\theta, \Delta Y, \Delta X)$" of the profile tape 7, and upon completing the rough grinding of the cam 1 for the first time by means of "$P(\Delta\theta, \Delta Y, \Delta X)$," the instruction "$M_0$" is given to the next "$\Delta Y_1$" of the sequence tape 9 to effectuate rough feeding.

Such instructions of "$\Delta Y_1$" "$M_1$" "$P(\Delta\theta, \Delta Y, \Delta X)$" "$M_0$" . . . "$\Delta Y_1$" "$M_1$" "$P(\Delta\theta, \Delta Y, \Delta X)$" are repeated for the fixed number of times ($m$), thus roughly grinding the cam 1 to the extent of the fixed amount and to bring the grinding wheel 3 to the position after rough grinding D.

The instruction "$M_0$" of the profile tape 7 read lastly at that time is followed by "$-\Delta Y_1$" of the sequence tape 9. This "$-\Delta Y_1$" is to provide the electrohydraulic pulse motor 23 with instructions so that the grinding wheel 3 in the position of the wheel after rough grinding D is returned in the direction of the start line A to the extent of the rough stock removal $\Delta Y_1$. This is necessary because the grinding wheel axis which has been pressed to the cam and deflected while during rough grinding would cause local distortion in grinding the cam if dressing should be continued while the grinding wheel 3 is retained at the position of the wheel after rough grinding D.

When the grinding wheel 3 thus returns from the position of the wheel after rough grinding D for the fixed distance owing to the instruction "$-\Delta Y$," the next "$M_3$" can be read. This "$M_3$" is to provide instructions so that the grinding wheel 3 can be dressed by means of the wheel truing unit 16, and when the next "—Δd" is read, the electrohydraulic motor 31 for dressing operates and advances the diamond 16' of the wheel truing unit 16 so that the fixed amount of dress Δd can be performed on the grinding wheel 3.

The next instruction "M₉" is to cause the diamond 16' of the wheel truing unit 16 which has been advanced to be reciprocally moved in the direction of the arrow by means of the hydraulic cylinder 33 to dress the grinding wheel 3 and simultaneously, the cam is finish-ground by the grinding wheel 3.

Next, "ΔY₁+Δd+ΔY₂" are consecutively read to provide the electrohydraulic pulse motor 23 with instructions so that the grinding wheel 3 can be fed the length of return (ΔY₁) of the grinding wheel 3 from the position of wheel after rough grinding D, the amount of dress (Δd) by which the size of the wheel has been reduced owing to dressing and the initial finish stock removal (ΔY₂) at the position of wheel prior to finish grinding E which commences finish grinding.

"M₁" is to provide instructions so that the reading of the sequence tape 9 is stopped and the reading of "P(Δθ, ΔY, ΔX)" of the profile tape is commenced. This "P(Δθ, ΔY, ΔX)" read upon receiving instruction is to provide instructions to carry out an operation similar to the previous one between the cam 1 and the grinding wheel 3 for the initial finish grinding.

After that, the reading of the sequence tape 9 is carried out by "M₀" as before, and subsequently, the finish feeding "ΔY₂" and, the reading of "P(Δθ, ΔY, ΔX)" and "M₀" of the profile tape 7 by "M(" are repeated for a fixed number of times ($n$), thus finish grinding the cam 1 the required amount and carrying the grinding wheel 3 to the position F of the wheel after finish grinding. "M₀" of the profile tape 7 lastly read at that time provides instructions so that the next "M₁" of the sequence tape 9 is read, and this "M₁" in turn provides instructions so that without feeding the grinding wheel 3 from the position of wheel after finish grinding F, the spark-out takes place upon providing the required contour of the cam by relative movement between the grinding wheel 3 and the cam 1.

The prescribed spark-out finishes after repeating the reading of "M₁", "P(Δθ, ΔY, ΔX)" and "M₀" for a fixed number of times ($r$). Also, the last "M₀" of the spark-out provides instructions so that $$\text{"}-(Y_1+m.\Delta Y_1+n.\Delta Y_2)\text{"}$$

and "M₅" of the sequence tape 9 are consecutively read. This "—(Y₁+m.ΔY₁+n.ΔY₂)" is to provide the electrohydraulic pulse motor 23 for vertical feed with an instruction so that the grinding wheel 3 which has been at the position of wheel after finish grinding F moves back to the quick traverse speed transfer position B, and "M₅" is to provide the hydraulic cylinder 22 for quick traverse with an instruction so that the grinding wheel 3 which has moved back to the quick traverse speed transfer position B moves further back toward the above-mentioned starting line A.

The invention thus grinds the cam by means of various instructions from the sequence tape 9 and the profile tape 7. In this case, in order to continuously grind cams having the same form in front of the grinding wheel 3 and which are rotationally offset from the cam previously ground, "M₃" and "θ" of the sequence tape 9 are continuously read so that the cam which is to be newly ground is indexfed to the position of the cam previously ground and index-rotated. That is, this "M₃" provides instructions to operate the hydraulic cylinder 18 for index feeding installed on the work table 15 so that the cam 1 to be newly ground is transported to apparatus in front of the grinding wheel 3, and "θ" provides instructions to operate the electrohydraulic pulse motor 19 for rotation of the cam installed on the work table 15 so that the cam to be newly ground in front of the grinding wheel 3 is index-rotated so that it is offset a prescribed angle relative to the cam previously ground. Thus, the index feeding of the cam to be newly ground is completed, and upon consecutively reading "M₄," "Y₁," "M₁" . . . of the sequence tape 9 and "P(Δθ, ΔY, ΔX)", "M₀" of the profile tape 7, each working part of the grinding machine 13 is instructed so as to repeat the grinding cycle the same as that of the cam previously ground and to grind the new cam 1 in the same form.

One example of the aforementioned grinding machine rotates the cam 1 at the required speed through the instructions from the profile tape 7 and the sequence tape 9 while moving the grinding wheel through the increment ΔY in the direction of feeding or moving the grinding wheel through the offset increment ΔX according to the rotating angle increment Δθ of the cam, to index-move in the direction of the axis or to index-rotate in the direction of rotation only the cam 1, and to quick-traverse only the grinding wheel relative to the cam. It is possible to modify the design so that either the cam or the grinding wheel operates to effectuate the index movement of the cam 1 in the direction of the axis, and the aforementioned increments ΔY and ΔX, and the independent quick feed of the grinding wheel.

If the sequence tape 9 and the profile tape 7 should be of the endless type so as to be continuously and repeatedly read, the grinding machine is designed so as to continuously grind a large number of cams of the same form and can use tapes shorter in length which are more efficient and economical. Also, the sequence tape 9 and the profile tape 7 may be combined into one tape when they are used for the grinding machine exclusively for machining a large number of cams of the same form. However, using two separate tapes for the grinding machine which has to accommodate a change of the grinding cycle of the cam due to changes of the form and material of the cam, and other grinding conditions is convenient and economical because changing either tape makes it easier to grind the required cam.

Indicating in the single profile tape 7 such instructions providing the rotating angle increment Δθ of the cam which forms the required contour of the cam, the increment ΔY of the grinding wheel 3 in the direction of feeding, the offset increment ΔX of the grinding wheel 3, etc. precludes the possibility of damaging the required contour of the cam which is caused by wear of the grinding wheel and changes of dressing or feeding amount as compared with the profile.

It is thought that the invention and its advantages will be understood from the foregoing description and it is apparent that various changes may be made in the process, construction and arrangement of the parts without departing from the spirit and scope of the invention or sacrificing its material advantages, the process and the articles hereinbefore described being merely a preferred embodiment of the invention.

We claim:

1. A grinding machine adapted to produce rotating type cams by means of numerical control, comprising grinding means for grinding a rotating type cam to a required contour, said contour being defined by a rotating angle increment Δθ of the cam, a lift increment ΔY and an offset increment ΔX of the contact point between said grinding means and said cam, rotating means for rotating the rotating type cam, and control means controlling said rotating means and said grinding means so that said grinding means will produce the required contour on the revolving type cam, said control means being tape controlled and including a profile tape having numerical information thereon as to the rotating angle increment Δθ of the cam and the lift increment ΔY and the offset increment ΔX of the contact point between said grinding means and said cam.

2. A grinding machine as claimed in claim 1 and including tape controlled dressing means for dressing said grinding means, tape controlled index means for index feed and index revolutions of said cam, moving means for moving said grinding means, and a sequence tape controlling said dressing means, said moving means and said index means.

3. In a cam grinding machine, the combination comprising a longitudinally slidable worktable, a workpiece carrying means on the worktable for rotatably supporting a workpiece, a control command giving means including prepared control signal information, a control pulse motor responsive to the control command giving means and connected for producing predetermined rotation and rotational angular index of the workpiece in response to command signals from the command giving means, a grinding wheel carrier movable toward and away from the workpiece and transversely relative to the axis of the workpiece, a grinding wheel rotatably mounted on said wheel carrier, a feed mechanism connected to the wheel carrier for giving the carrier and grinding wheel feed movement and curved motion synchronized to the predetermined incremental rotation of the workpiece, a reversible control motor responsive to the control command giving means and connected to give a predetermined feed movement to the wheel carrier and the grinding wheel in response to a command signal from the command giving means and to give a predetermined curved displacement of the wheel carrier and the grinding wheel and thus of the abrasive contact point between the grinding wheel and the workpiece.

4. The combination as claimed in claim 3 and further comprising means to effect relative longitudinal movement between said worktable and said grinding wheel to position successive workpieces in operative relation to said grinding wheel, a command receiver responsive to the said control command giving means and operatively connected thereto for operation of said longitudinal movement means to cause the said longitudinal movement in response to a command signal from the control command giving means.

5. The combination as claimed in claim 4 in which said means to effect a relative longitudinal movement comprises a longitudinal feed piston means operatively connected to the worktable, a command receiver responsive to the said control command giving means and operatively connected to the said piston means to supply the predetermined longitudinal operation position index to the workpiece in response to a command signal from the control command giving means.

6. The combination as claimed in claim 3 in which said feed mechanism comprises a rapid feed piston means connected for rapid feed movement of the wheel carrier toward and away from the workpiece, a command receiver responsive to the said control command giving means and operatively connected for operation of the said rapid feed piston means in response to a command signal from the command giving means, a pair of feed screw means operatively connected for curved motion of the wheel carrier, a reversible control motor responsive to the said control command giving means and connected for synchronized operation of the said feed screw means in response to a command signal from the control commanding means to produce curved motion of the grinding wheel.

7. The combination as claimed in claim 3 further comprising a grinding wheel dressing means mounted on the said wheel carrier, a control motor responsive to the control command giving means and connected for operation of the said dressing means in response to a command signal from the control command giving means.

8. The combination as claimed in claim 7 in which said grinding wheel dressing means comprises a transverse reciprocation piston means, a control command receiver responsive to the control command giving means and operatively connected for transverse reciprocation of the piston means in response to a command signal from the command giving means, a dressing tool operatively mounted on the said piston means, a feed screw means operatively connected to the said dressing tool, a reversible control motor responsive to the control command giving means and operatively connected to the feed screw means for operation in response to a command signal from the control command giving means.

References Cited
UNITED STATES PATENTS

| | | | |
|---|---|---|---|
| 1,017,879 | 2/1912 | Landis | 51—101 |
| 3,056,240 | 10/1962 | Morgan et al. | 51—165 |
| 3,083,580 | 4/1963 | Carson et al. | 90—13 |
| 3,247,620 | 4/1966 | Happel | 51—105 |

LESTER M. SWINGLE, *Primary Examiner.*